(12) United States Patent
Konersmann et al.

(10) Patent No.: US 9,141,411 B2
(45) Date of Patent: Sep. 22, 2015

(54) MODEL SLICING AND VERSIONING

(75) Inventors: Scott A. Konersmann, Monroe, WA (US); Edward W. Dudenhoefer, Kirkland, WA (US); Samer Boshra, Woodinville, WA (US); Maciej Sarnowicz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 706 days.

(21) Appl. No.: 12/895,482

(22) Filed: Sep. 30, 2010

(65) Prior Publication Data
US 2012/0084421 A1 Apr. 5, 2012

(51) Int. Cl.
G06F 15/173 (2006.01)
G06F 3/00 (2006.01)
G06F 9/445 (2006.01)
H04L 12/24 (2006.01)

(52) U.S. Cl.
CPC ........ *G06F 9/44536* (2013.01); *H04L 41/0233* (2013.01)

(58) Field of Classification Search
CPC .......................... H04L 41/0233; G06F 9/44536
See application file for complete search history.

(56) References Cited

U.S. PATENT DOCUMENTS

| | | | |
|---|---|---|---|
| 5,542,078 A | | 7/1996 | Martel et al. |
| 5,838,965 A | | 11/1998 | Kavanagh et al. |
| 6,223,344 B1 | * | 4/2001 | Gerard et al. ................. 717/170 |
| 6,871,346 B1 | | 3/2005 | Kumbalimutt et al. |
| 7,222,147 B1 | * | 5/2007 | Black et al. ................... 709/200 |
| 7,409,386 B2 | | 8/2008 | Hongell et al. |
| 7,454,413 B2 | | 11/2008 | Lakshminarayanan et al. |
| 2002/0100017 A1 | * | 7/2002 | Grier et al. ..................... 717/120 |
| 2004/0236633 A1 | * | 11/2004 | Knauerhase et al. ........... 705/26 |
| 2005/0004816 A1 | | 1/2005 | Abraham-Fuchs et al. |
| 2005/0097087 A1 | * | 5/2005 | Punaganti Venkata et al. ... 707/3 |
| 2005/0210133 A1 | * | 9/2005 | Florissi et al. ................ 709/224 |
| 2005/0234873 A1 | * | 10/2005 | Milligan et al. ................... 707/3 |
| 2006/0026585 A1 | * | 2/2006 | Haselden et al. ............. 717/168 |
| 2006/0150182 A1 | * | 7/2006 | Hughes et al. ................ 717/174 |

(Continued)

OTHER PUBLICATIONS

Dinesh Kulkarni et. al., LINQ to SQL: .NET Language-Integrated Query for Relational Data, Pub. Date Mar. 2007 (1 page).

(Continued)

*Primary Examiner* — Joe Chacko
(74) *Attorney, Agent, or Firm* — Aneesh Mehta; Stein Dolan; Micky Minhas (57) ABSTRACT

Embodiments are directed to implementing a dynamically changeable system model that is customizable per version, programmatically generating system models at runtime and to extending a programmatically generated system model. In an embodiment, a computer system determines that a dynamically changeable system model corresponds to a managed system. The dynamically changeable system model includes various managed system objects. The computer system indicates for the dynamically changeable system model which managed system objects are available in each version of the managed system. The available managed system objects are stored in a data store of the dynamically changeable system model. The computer system requests the managed system to provide current managed system information including at least a version identifier and, based on the managed system information indicated by the managed system, provides to the dynamically changeable system model those managed system objects that are provided by the indicated version of the managed system.

20 Claims, 4 Drawing Sheets

(56) References Cited

U.S. PATENT DOCUMENTS

2009/0144229 A1 6/2009 Meijer et al.
2009/0150367 A1 6/2009 Melnik et al.
2009/0319501 A1 12/2009 Goldstein et al.
2009/0328016 A1 12/2009 Ng et al.

OTHER PUBLICATIONS

Pedram Rezaei, Building a LINQ Provider, Aug. 3, 2010 (Retrieved Date), (23 pages).
Scott Guthrie, LINQ to SQL (Part 9—Using a Custom LINQ Expression with the <asp:LinqDatasource> control), Pub. Date: Sep. 7, 2007, (2 pages).
Erik Meijer, There Is No Impedance Mismatch (Language Integrated Query in Visual Basic 9), Pub. Date: Oct. 2006 (2 pages).
SQL Server Management Objects (SMO): An Overview of SQL Server 2005 for the Database Developer, Retrieved Date: Aug. 4, 2010 (1 page).
On Separation between Interface, Implementation, and Representation in Object DBMS, Pub. Date: Aug. 3, 1998 (14 pages).
Managing the user environment, Retrieved Date: Aug. 4, 2010, (2 pages).
SQL Server Analysis Services Data Portability Overview, Pub. Date: Jun. 10, 2010 (11 pages).
SMO (SQL Server Management Object) in SQL Server 2005/2008, Pub. Date: Jan. 17, 2010 (2 pages).
John D. Poole, Model-Driven Architecture: Vision, Standards and Emerging Technologies, Pub. Date Apr. 2001 (15 pages).
A Metadata Based Architectural Model for Dynamically Resilient Systems, Pub. Date: Mar. 11-15, 2007, (8 pages).
E. James Whitehead, Jr., Design Spaces for Link and Structure Versioning, Aug. 5, 2010 (Retrieved Date), (10 pages).
Metadata Services (MDS) in Fusion Middleware 11g, Aug. 5, 2010 (Retrieved Date), (24 pages).

* cited by examiner

MODEL SLICING AND VERSIONING

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, client computer systems may be configured to request and receive services or software applications hosted by a back-end server. In some cases, the back-end server's services may have various different service operations. These service operations are typically tied to model objects and will only work with those specific model objects. Moreover, object properties are typically converted between models each time a different back-end version is used.

BRIEF SUMMARY

Embodiments described herein are directed to implementing a dynamically changeable system model that is customizable per version, programmatically generating system models at runtime and extending a programmatically generated system model. In one embodiment, a computer system determines that a dynamically changeable system model corresponds to a managed system. The dynamically changeable system model includes various managed system objects. The computer system indicates for the dynamically changeable system model which managed system objects are available in each version of the managed system. The available managed system objects are stored in a data store of the dynamically changeable system model. The computer system requests the managed system to provide current managed system information including at least a version identifier and, based on the managed system information indicated by the managed system, provides to the dynamically changeable system model those managed system objects that are provided by the indicated version of the managed system.

In another embodiment, a computer system accesses managed system objects store in a data store in a managed system. The computer system determines those relationships and properties corresponding to the managed system objects. The relationships and properties are, at least in some cases, different for different versions of the managed system. The computer system programmatically generates a system model at runtime based on the accessed managed system objects and the objects' corresponding relationships and properties. The computer system may also extend the programmatically generated system model to include support for a plurality of different managed system editions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to implementing a dynamically changeable system model that is customizable per version, programmatically generating system models at runtime and extending a programmatically generated system model. In one embodiment, a computer system determines that a dynamically changeable system model corresponds to a managed system. The dynamically changeable system model includes various managed system objects. The computer system indicates for the dynamically changeable system model which managed system objects are available in each version of the managed system. The available managed system objects are stored in a data store of the dynamically changeable system model. The computer system requests the managed system to provide current managed system information including at least a version identifier and, based on the managed system information indicated by the managed system, provides to the dynamically changeable system model those managed system objects that are provided by the indicated version of the managed system.

In another embodiment, a computer system accesses managed system objects store in a data store in a managed system. The computer system determines those relationships and properties corresponding to the managed system objects. The relationships and properties are, at least in some cases, different for different versions of the managed system. The computer system programmatically generates a system model at runtime based on the accessed managed system objects and the objects' corresponding relationships and properties. The computer system may also extend the programmatically generated system model to include support for a plurality of different managed system editions.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
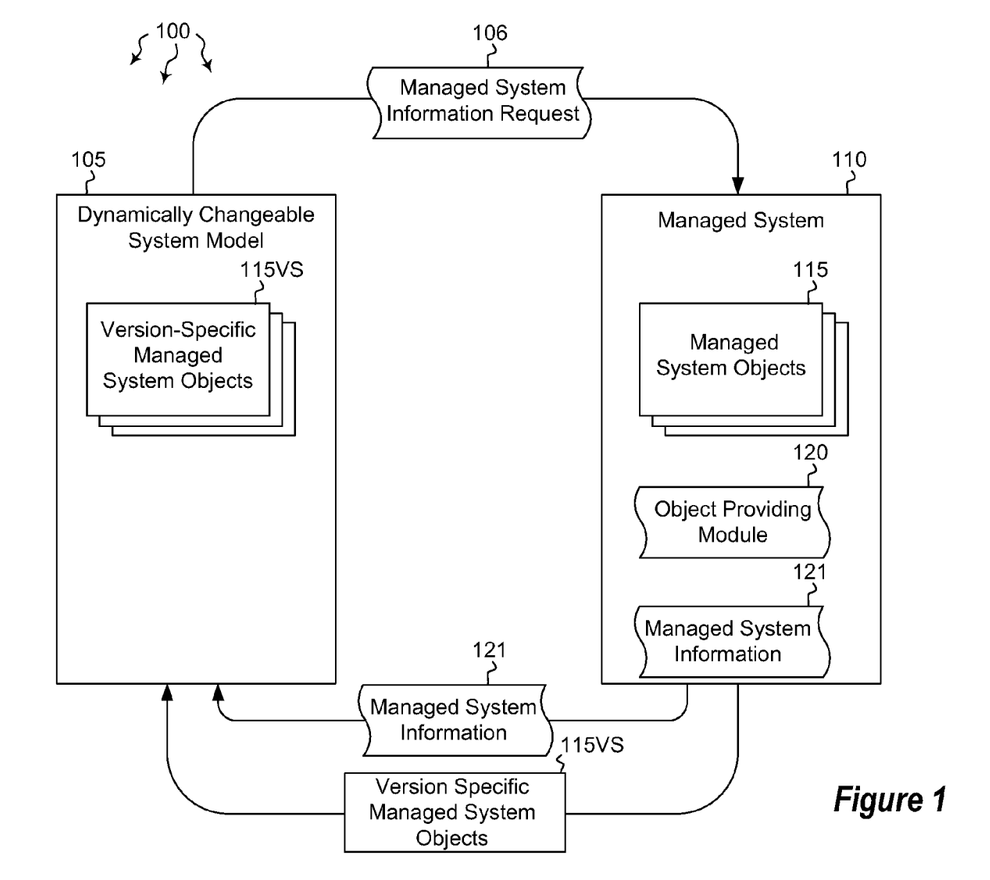
FIG. 1 illustrates a computer architecture in which embodiments of the present invention may operate including implementing a dynamically changeable system model that is customizable per version and programmatically generating system models at runtime.

FIG. 1 illustrates a computer architecture 100 in which the principles of the present invention may be employed. Computer architecture 100 includes managed system 110. Managed system, as the term is used herein, may refer to any type of computer server, database server, back-end server, distributed server or other computer system configured to store data and provide services. Managed system 110 may provide any type of service including authentication services, data lookup services, applications, web services or any other type of functionality which a user may access via the managed system. The managed system may have one or more managed system objects 115, or system objects. These objects may include any type of information or stored data including database tables, data files, user objects or any other type of data objects used in conjunction with the provided services. The objects may also include various properties and relationships between the objects. These properties and relationships may be stored in metadata associated with the objects.

In some embodiments, managed system 110 is represented by, is modeled by, or is accessible using dynamically changeable system model 105. The system model 105 may represent various aspects of the managed system including the managed system objects. In some cases, the managed system is versioned, such that different versions include different features, different services and/or different managed system objects. Moreover, the managed system may come in different editions, where each edition is configured to provide different services, using different managed system objects. Accordingly, the dynamically changeable system model may be dynamically changed to accurately represent the current version of the managed system.

The managed system may include different portions of identifying information. For instance, the managed system may include a version identifier that identifies its current version. The managed system may also include other information that may be queried including edition, traits, capabilities and permissions. Each of these types of managed system information is individually queryable and may be requested in lieu of or in addition to a version identifier (e.g. 106).

Using this managed system information, the system model may determine that the back-end server (managed system) is version 10, for example, and may be mapped to that version of back-end server. The system model may determine that the back-end server (managed system) is version 10 and is a Web edition, for example, and may be mapped to that version and edition of back-end server. The system model may determine that the back-end server is version 10, Web Edition, does not have a debugging feature installed, and that the current user is an administrator. In such cases, the system model may map to a model for that version and edition, remove debugging features from the model, and avoids filtering based on permissions because the current user is an administrator. If the user were an end-user with no administrator rights, the system model would remove (i.e. filter) administrator objects and operations from the model.

In another example, the system model may determine that the back-end server is version 10, Web Edition, and that the user has requested a "Security" view of the model. The version 10 Web Edition model is refined by removing all objects, operations, and relationships that are not security related. Accordingly, managed system information may be used to refine the system model in a variety of different ways. It will be understood by one skilled in the art that the above examples are for illustration purposes only and are not intended to limit the scope of how managed system information can be used to refine a system model.

Thus, at least in some embodiments, the system model 105 may send a managed system information request 106 to the managed system 110 to determine various managed system information including which version (or edition) the managed system is currently using. The managed system information 121 may then be sent to the dynamically changeable system model. Object providing module 120 of managed system 110 may also provide those managed system objects 115 that correspond to the management system's current version. Accordingly, version-specific managed system objects 115VS may be sent to, received, and stored by system model 105. These version-specific managed system objects may then be provided to a user. For instance, the system model may have a corresponding user interface that displays the various features offered by the managed system. These features (and their corresponding managed system objects) may be dynamically added or removed from the user interface, based on which back-end server (e.g. 110) the model is connected to. As such, a user (specifically, a developer), may be able to use the user interface to author various tools for use with the managed system.

Thus, at least in some cases, a single system model may be implemented that varies across time and within versions. The model topology including types, type properties and relations amongst types, may vary per version. In some embodiments, the model 105 may be viewed (sliced) along a number of dimensions (product, stock-keeping unit (SKU), major version, minor version, etc.). This allows management tools to work against disparate back-end versions, as well as vary the models exposed within a single product. Model slicing also allows users to modify behavior of services implemented on top of the dynamically changeable system model depending on the managed system version. Users that implement the model may not need any special version specific code in the model implementation tools, and only the models, properties, and relationships appropriate to the model slice are shown to the user. Extension plugin code may be registered to provide metadata element-based or runtime instance-based processing differences which may optionally be provider-specific. This may allow a particular back-end version to show a segment feature which is a part of a database spread across multiple computer systems, but is missing when connected to another instance of the same version.

Figure 4:
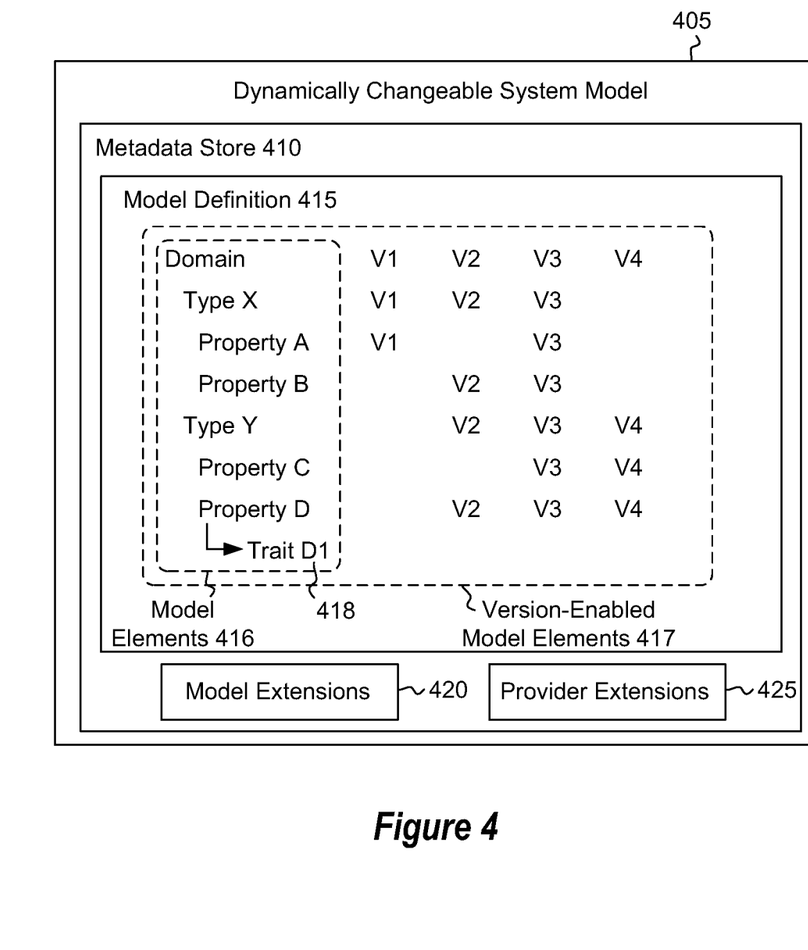
FIG. 4 illustrates an embodiment of the present invention depicting an example dynamically changeable system model.

FIG. 4 depicts various aspects of a dynamically changeable system model 405. A model definition 415 including model elements 416 and version-enabled model elements 417 may be included in metadata store 410. The model elements 416 may include domains, types and properties for the different types. Properties may also have corresponding traits 418 which may indicate various information about the property (e.g. that the property is computationally expensive, or is read-only). Each of the domains, types and properties may be present in some versions of a managed system, and not present in other systems. Accordingly, the V1, V2, V3 and V4 next to each element represents that the item is included in version 1, version 2, version 3 or version 4. If the V(X) identifier is absent, its absence indicates that that domain, type or property is not included in that version. This concept will be explained in greater detail below.

In some embodiments, the following items occur at design (coding) time: a model author may define a dynamically changeable system model in terms of domains, types, properties and relations. The model may be defined as a superset of all possible features to be managed. The model author may define which parts of the overall model definition are specific to various product versions, using product type and version ranges within the product type. The model author may append built-in trait flags (e.g. 418) or user-defined trait flags to any metadata element. These trait flags may also vary for different product types and versions.

Continuing at design time, a model author may write model extensions (e.g. 420) that capture implementation of behavior specific to product type and version. Those extensions are marked with product and version information, and may additionally be used on metadata elements or their corresponding runtime instance equivalents, as well as for different provider types. Model extensions may be grouped and implemented in separate modules (e.g. dynamically linked libraries (DLLs)) according to a user's (i.e. developer's or development team's) desired packaging and association goals, which allows the model to load and use the extensions when needed.

In some embodiments, the following items may occur at run-time: a client application may create a request to initialize one or more framework components and to establish a connection to the back-end system 110. Once the connection is established, the framework interrogates the back-end system about its version or other managed system information (e.g. in managed system information request 106), product and SKU variations. The framework may use the managed system information to modify the model 105 dynamically, based on the model's definition 415 and version-specific information (i.e. version-specific managed system objects 115VS). The modified, or "sliced" version of the model may be returned to the client. Various portions of client code may interact with the model and may only see those parts of the model that are applicable to the current back-end system version. In some cases, generic framework services may utilize the version-specific extensions (e.g. 420 and/or 425) to adjust the client code to a back-end version-specific mode.

At runtime, an entire loaded metadata graph, including both the raw un-versioned view over all metadata elements and their associations, as well as specific version-sliced views of any domain model which have been defined, are available for use by tools or other applications to generically drive processing. These and other concepts will be explained in greater detail below with regard to methods 200 and 300 of FIGS. 2 and 3, respectively.

Figure 2:
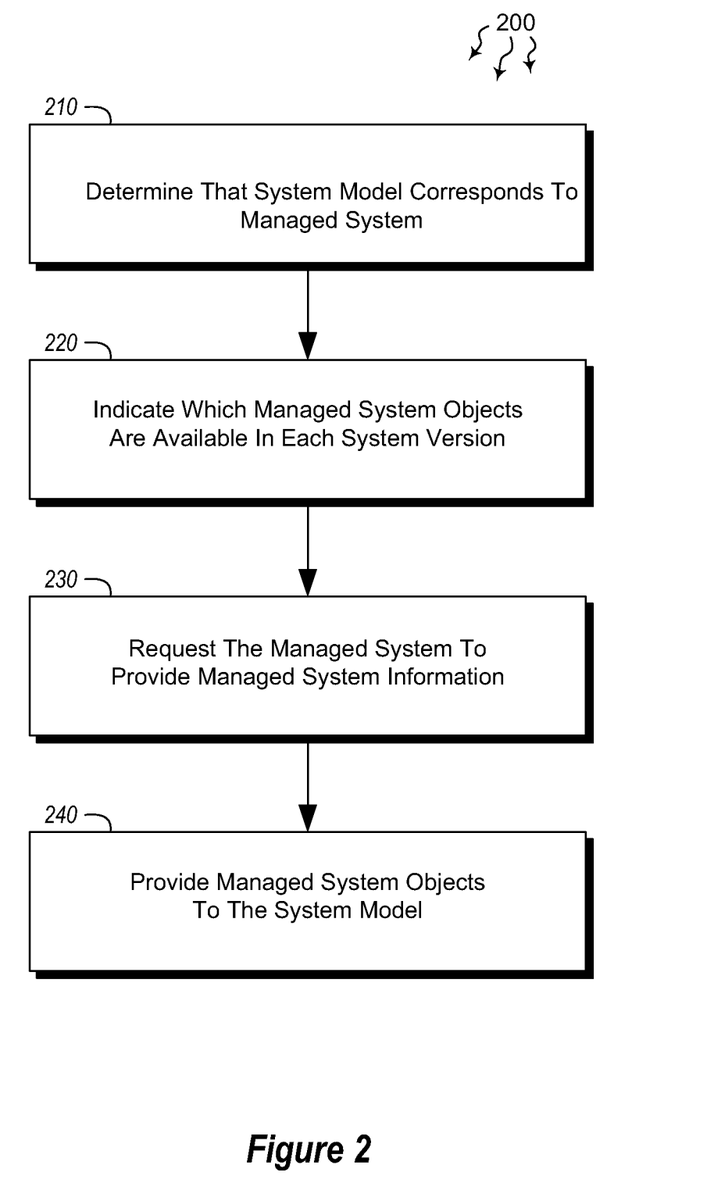
FIG. 2 illustrates a flowchart of an example method for implementing a dynamically changeable system model that is customizable per version.
Figure 3:
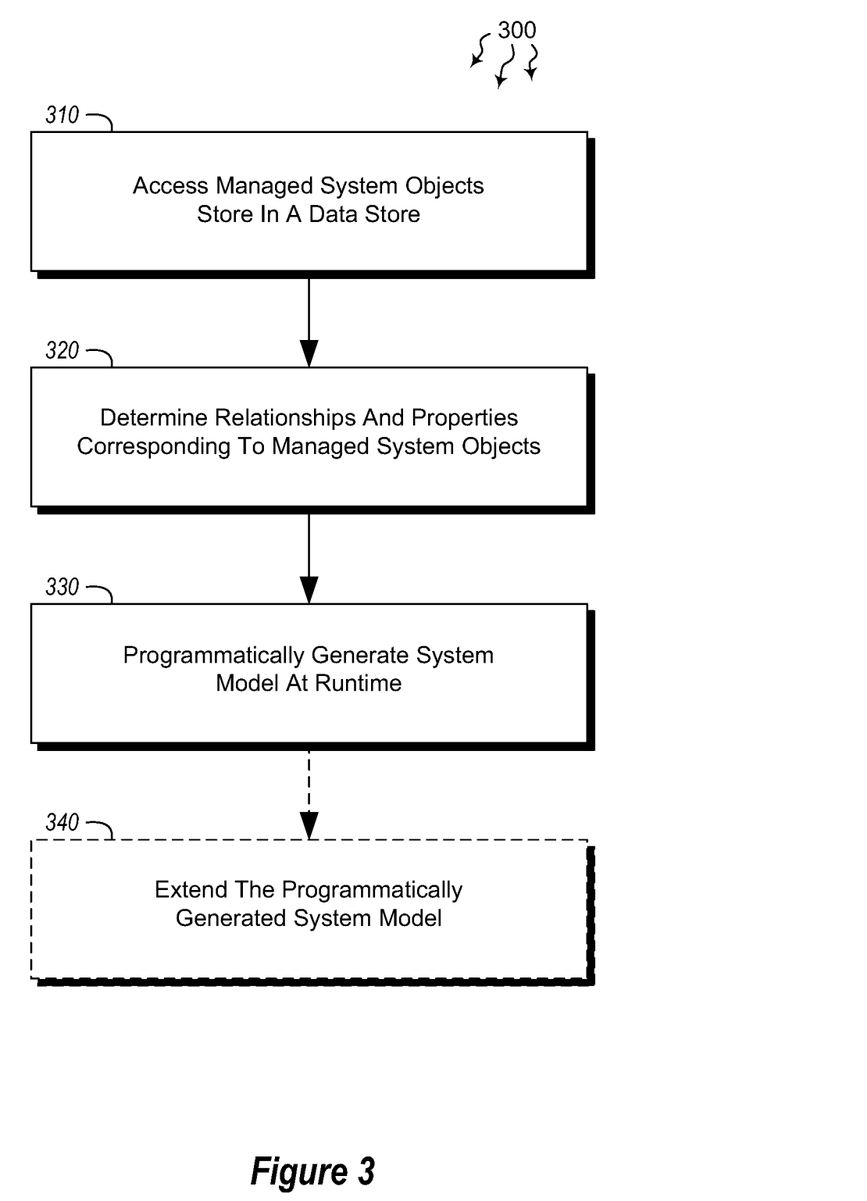
FIG. 3 illustrates a flowchart of an example method for programmatically generating system models at runtime.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for implementing a dynamically changeable system model that is customizable per version. The method 200 will now be described with frequent reference to the components and data of environment 100.

Method 200 includes an act of determining that a dynamically changeable system model corresponds to a managed system, the dynamically changeable system model including one or more managed system objects (act 210). For example, dynamically changeable system model 105 may correspond to, represent or be based on managed system 110. The system model may include one or more managed system objects of the managed system. These system objects may be version-specific objects that apply to a specific version of managed system 110. As indicated above, the managed system objects may include any or all of the following: domains, types, type properties and type relationships. In some embodiments, only those elements that correspond to a given version of the back-end server are mapped to the dynamically changeable system model 105.

Method 200 includes an act of indicating for the dynamically changeable system model which managed system objects are available in each version of the managed system, wherein the available managed system objects are stored in a data store of the dynamically changeable system model (act 220). For example, managed system 110 may indicate to dynamically changeable system model 105 which managed system objects 115 are available for at least the current version of the managed system. In some embodiments, the managed system may indicate which managed objects (including domains, types, type properties and type relations) are available for each different version of the managed system.

Trait information may be appended to different type properties and may indicate various information about the property to which it is appended. The trait information may indicate that the property is expensive to compute (e.g. where the property is total rows in database) or is write- o read-only. Many other traits may be appended and one skilled in the art will recognize that the above are merely limited examples of the many different types of trait information which may be appended to a property. The trait information may be stored as metadata. The trait metadata may be updated in the dynamically changeable system model 405 based on the indicated managed system information 121. Accordingly, when a different version ID is detected, the trait metadata may be automatically updated to match the current version being used.

In some cases, the dynamically changeable system model allows users to add or remove metadata trait information associated with each managed system object. Accordingly, at least in some cases, the metadata trait information may be added to (or removed from) any of the different model elements 416. The metadata trait information may include user-, developer- or administrator-defined information describing one or more traits of a given managed system object. Regardless of where the trait information originated, it may be changed for each different back-end version the system model is connected to.

Returning to FIG. 2, method 200 includes an act of requesting the managed system to provide managed system information including at least a current version identifier (act 230). For example, dynamically changeable system model 105 may request managed system 110 to provide managed system information 121 which may include a version identifier. The managed system information 121 may also include edition information, traits, capabilities, permissions and other system information.

Method 200 includes, based on the managed system information indicated by the managed system, an act of providing to the dynamically changeable system model those managed system objects that are provided by the indicated version of the managed system (act 240). For example, based on managed system information 121, object providing module 120 may provide to dynamically changeable system model 105 version-specific managed system objects 115VS. Thus, depending on which version of the managed system the model is connected to, the model will have that version's managed objects. If the dynamically changeable system model determines that it is connected to a managed system with different managed system information, the model can be dynamically updated with the managed system objects of the new managed system.

In some cases, multiple different managed system objects may change between versions. In such cases, managed system objects not supported by the new managed system are not offered by the dynamically changeable system model. Similarly, managed system objects supported by the new managed system that were not supported by the previous managed system are now offered by the dynamically changeable system model. Mappings may be used to map the various managed system objects from the managed system to the system model. In some embodiments, the mappings themselves may be versioned so that mappings associated with one managed system version stay with that version, and new mappings are created for new managed system versions.

Dynamically changeable system model 105 may include various types of extensions. For instance, the model may include model extensions 420 and provider extensions 425, as shown in FIG. 4. The model extensions may add functionality to the model, based on the version of the managed system. Moreover, provider extensions may offer additional functionality to a provider that is designed to provide the managed system's services.

Other extension may include dynamic type, relation or property element extensions, metadata extensions, runtime instance extensions, provider-specific extension and provider-agnostic extensions. Each of these extensions may be version specific to the version of managed system being used. Each extension may be authored by a developer or other user to provide extended functionality to various portions of the system model. The extended functionality may, at least in some cases, change the behavior of the system model. In some cases, a default implementation behavior may be attached to each of the extension behaviors. This default behavior then would be implemented by default unless overridden by a more specific binding extension. Dynamically changeable system model may also allow users to add or remove extension code plugins associated with the model.

Turning now to FIG. 3, FIG. 3 illustrates a flowchart of a method 300 for programmatically generating system models at runtime. The method 300 will now be described with frequent reference to the components and data of environment 100.

Method 300 includes an act of accessing one or more managed system objects store in a data store in a managed system (act 310). For example, a programmer or developer desiring to generate a system model at runtime may access managed system objects 115 stored in a data store in managed system 110. These managed system objects, including types, type properties and relationships, may be changeable on the fly. Various different system models may be presented to a user upon request. For instance, based on a user's model accessing permissions, different system models may be presented to the user for different managed system editions. Thus, in cases where certain users are restricted to certain editions or versions, only the models to which the user is restricted will be shown to them.

Method 300 further includes an act of determining those relationships and properties corresponding to the managed system objects, wherein the relationships and properties are different for different versions of the managed system (act 320). For example, a developer or other user may query the managed system 110 to determine or discover which relationships and/or properties are associated with each of the managed system objects. As mentioned above, the various system objects may have different relationships and different properties depending on which version of back-end server is currently in use. As shown in FIG. 4, many of the properties and types are not available in all four versions. For instance, property A is only available in versions 1 and 3, while property B is only available in versions 2 and 3. Many other types and versions are possible. The example shown in FIG. 4 is illustrative only and is not limiting on which model elements may be included or the number of versions they may or may not be included in. Still further, while versions 1-4 are shown, other levels of inclusion may be included in lieu of or in addition to version. For instance, if a program or service has different editions, and different versions of each edition, the inclusion chart would become much more complex.

Method 300 also includes an act of programmatically generating a system model at runtime based on the accessed managed system objects and the objects' corresponding relationships and properties (act 330). For example, dynamically changeable system model 105 may be programmatically generated at runtime based on the accessed managed system objects 115 and the objects' corresponding version-specific relationships and properties. In some cases, the programmatically generated system model may be extended to include support for multiple different managed system editions and/or versions.

Thus, systems, methods and computer program products are provided which implement a dynamically changeable system model that is customizable per version. Moreover, systems, methods and computer program products are provided which programmatically generate system models at runtime. These system models may be dynamically modified and updated when connected to different managed systems. This allows a single, changeable system model to be used with multiple different back-end systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for implementing a dynamically changeable system model that is customizable per version of a managed system, the method comprising:

determining that a dynamically changeable system model corresponds to a managed system, the dynamically changeable system model including one or more versioned managed system objects that correspond to one or more managed system objects at the managed system, the one or more managed system objects corresponding to data used in conjunction with one or more services provided by the managed system, the dynamically changeable system model being configured to provide access to the managed system and to dynamically adapt as the one or more managed system objects at the managed system change, such that the dynamically changeable system model represents which managed system objects correspond to a current version of the managed system to one or more users;

the managed system indicating to the dynamically changeable system model which of the one or more managed system objects are available in each version of the managed system, wherein the available managed system objects are stored in a data store of the dynamically changeable system model as the one or more versioned managed system objects;

the dynamically changeable system model requesting the managed system to provide managed system information including at least a current version identifier; and based on the managed system information indicated by the managed system, the managed system providing to the dynamically changeable system model those managed system objects that are provided by the indicated version of the managed system, the managed system objects including one or more managed system objects and one or more features that are specific to the indicated version of the managed system.

2. The method of claim 1, wherein the managed system objects include at least one of the following: types, type properties and type relationships.

3. The method of claim 1, wherein metadata trait elements are updated in the dynamically changeable system model based on the indicated managed system information.

4. The method of claim 1, wherein only those elements that correspond to a given portion of managed system information are mapped to the dynamically changeable system model.

5. The method of claim 1, further comprising an act of dynamically updating the system model upon determining that the system model is connected to a new managed system with different managed system information.

6. The method of claim 5, wherein a plurality of one or more managed system objects change between versions, such that managed system objects not supported by the new managed system are not offered by the dynamically changeable system model.

7. The method of claim 5, wherein one or more managed system objects change between versions, such that at least one managed system object supported by the new managed system that was not supported by the previous managed system is offered by the dynamically changeable system model.

8. The method of claim 1, wherein the dynamically changeable system model allows users to add or remove metadata trait information associated with each managed system object.

9. The method of claim 8, wherein the metadata trait information comprises user-defined information describing one or more traits of a given managed system object.

10. The method of claim 8, wherein the metadata trait information associated with each managed system object changes for each different portion of managed system information.

11. The method of claim 1, wherein the dynamically changeable system model allows users to add or remove extension code plugins associated with the dynamically changeable system model.

12. The method of claim 1, wherein mappings between managed system objects and the system model are versioned.

13. The method of claim 1, wherein the dynamically changeable system model includes at least one of dynamic type, relation or property element extensions, metadata extensions, runtime instance extensions, provider-specific extension and provider-agnostic extensions.

14. The method of claim 13, wherein the various extension allow different system model implementations to have different behaviors.

15. The method of claim 14, wherein a default implementation behavior is attached to each of the behaviors, and is implemented unless overridden by a more specific binding extension.

16. A computer program product for implementing a method for programmatically generating system models at runtime, the computer program product comprising one or more hardware storage devices having stored thereon computer-executable instructions that, when executed by one or more processors of the computing system, cause the computing system to perform the method, the method comprising:
  accessing one or more managed system objects store in a data store in a managed system, the one or more managed system objects corresponding to data used in conjunction with one or more services provided by the managed system;
  determining those relationships and properties corresponding to the managed system objects, wherein the relationships and properties are different for different versions of the managed system; and
  programmatically generating a dynamically changeable system model at runtime based on the accessed managed system objects and the objects' corresponding relationships and properties, the managed system objects including one or more managed system objects and one or more features that are specific to the indicated version of the managed system, wherein the dynamically changeable system model stores one or more versioned managed system objects that correspond to the managed system objects, and wherein the dynamically changeable system model is configured to provide access to the managed system and to dynamically adapt as the one or more managed system objects at the managed system change, such that the dynamically changeable system model represents which managed system objects correspond to a current version of the managed system to one or more users.

17. The computer program product of claim 16, wherein managed system object properties and relationships are changeable on the fly.

18. The computer program product of claim 16, wherein the dynamically changeable system model is extended to include support for a plurality of different managed system editions.

19. A computer system comprising the following:
  one or more processors;
  system memory;
  one or more computer-readable storage media having stored thereon computer-executable instructions that, when executed by the one or more processors, causes the computing system to perform a method for extending a programmatically generated system model, the method comprising the following:
    accessing one or more managed system objects store in a data store in a managed system, the one or more managed system objects corresponding to data used in conjunction with one or more services provided by the managed system;
    determining those relationships and properties corresponding to the managed system objects, wherein the relationships and properties are different for different versions of the managed system;
    programmatically generating a dynamically changeable system model at runtime based on the accessed managed system objects and the objects' corresponding relationships and properties, the managed system objects including one or more managed system objects and one or more features that are specific to the indicated version of the managed system, wherein the dynamically changeable system model stores one or more versioned managed system objects that correspond to the managed system objects, and wherein the dynamically changeable system model is configured to provide access to the managed system and to dynamically adapt as the one or more managed system objects at the managed system change, such that the dynamically changeable system model represents which managed system objects correspond to a current version of the managed system to one or more users; and
    extending the dynamically changeable system model to include support for a plurality of different managed system editions.

20. The computer system of claim 19, further comprising presenting different system models for different managed system editions, based on a model user's model accessing permissions.

* * * * *